May 12, 1953  J. BOWEN  2,638,258
JAR CAPPING APPARATUS
Filed Dec. 7, 1949  10 Sheets-Sheet 1

INVENTOR.
Joe Bowen
BY Soans, Pond & Anderson
Attys.

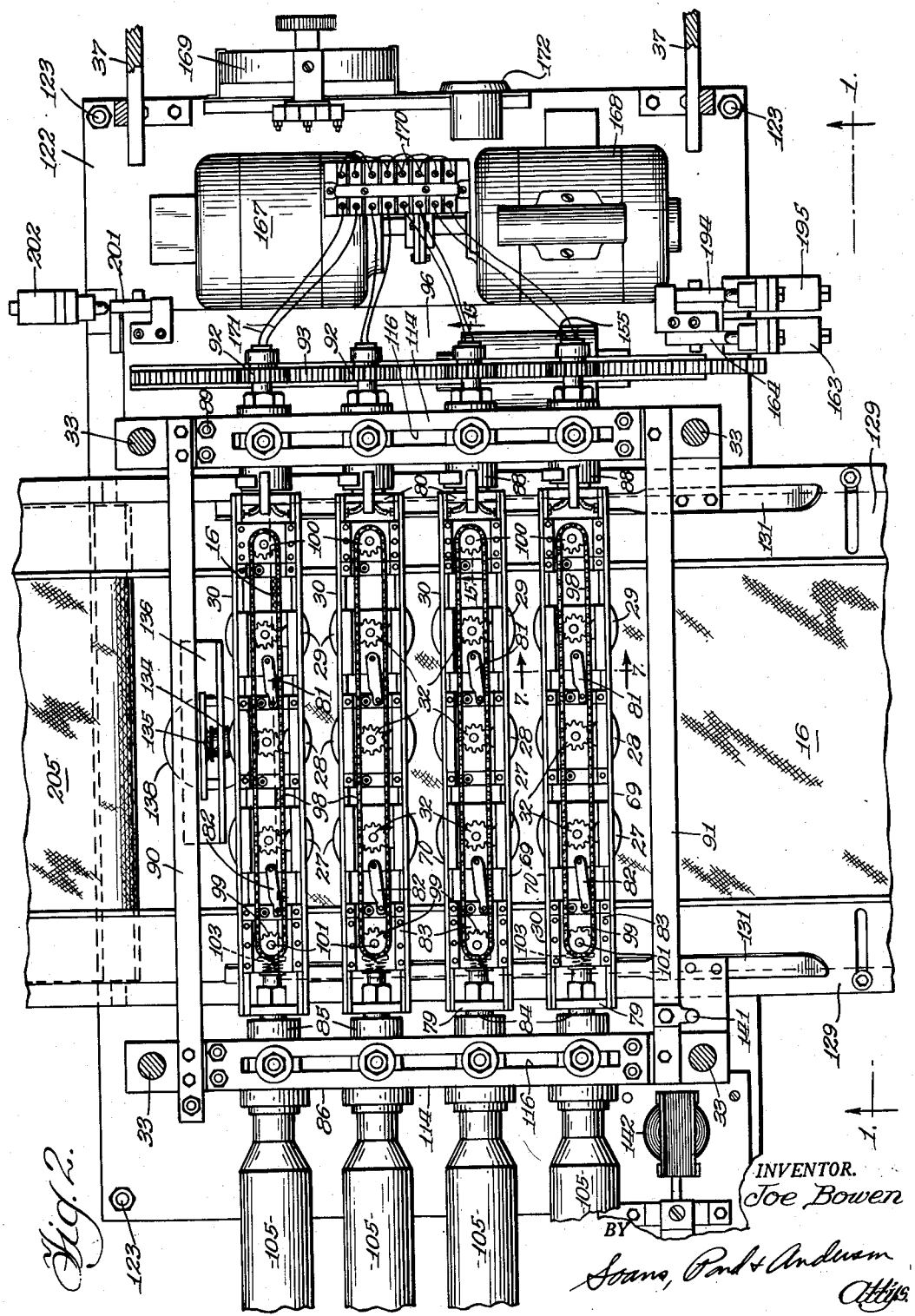

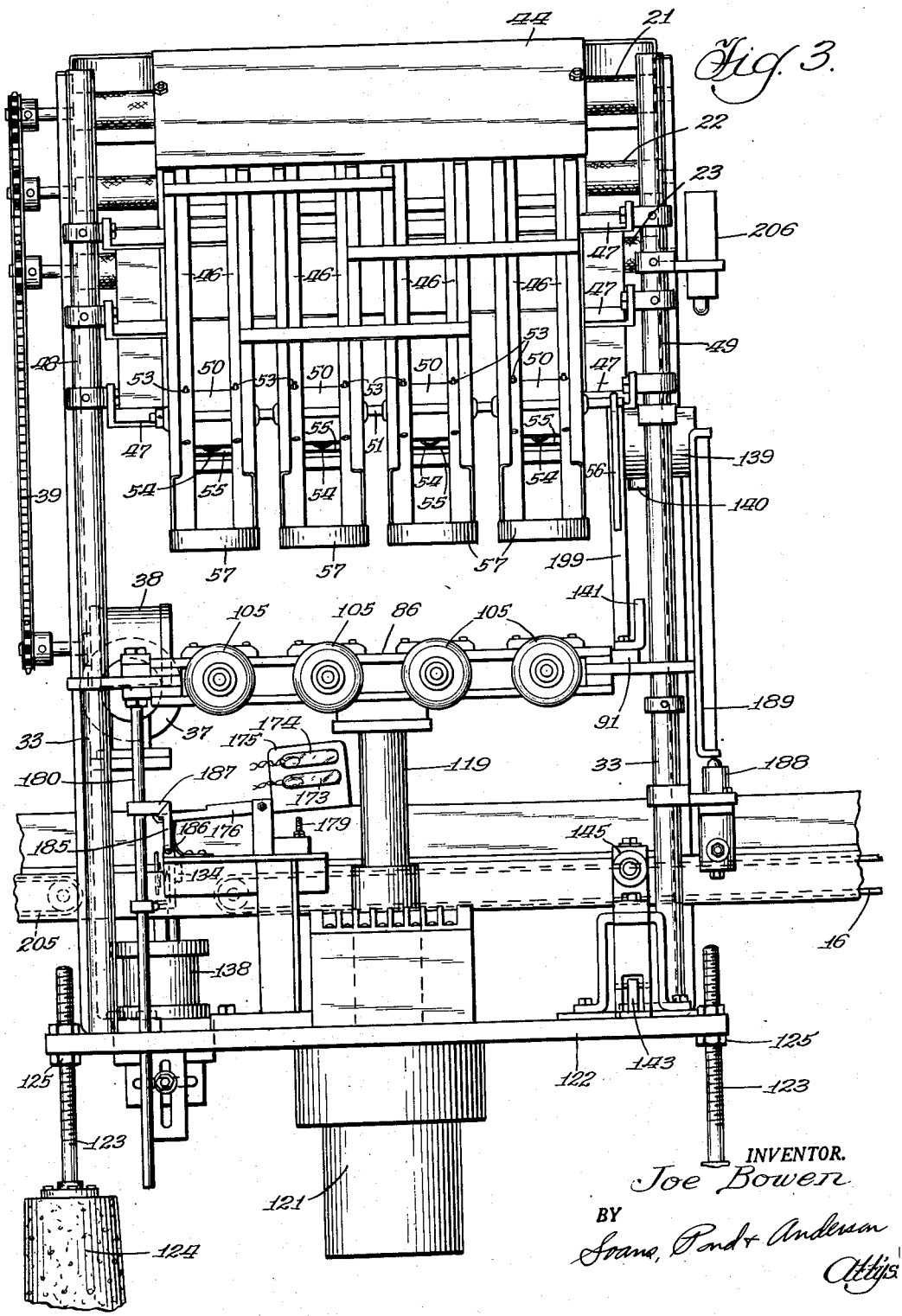

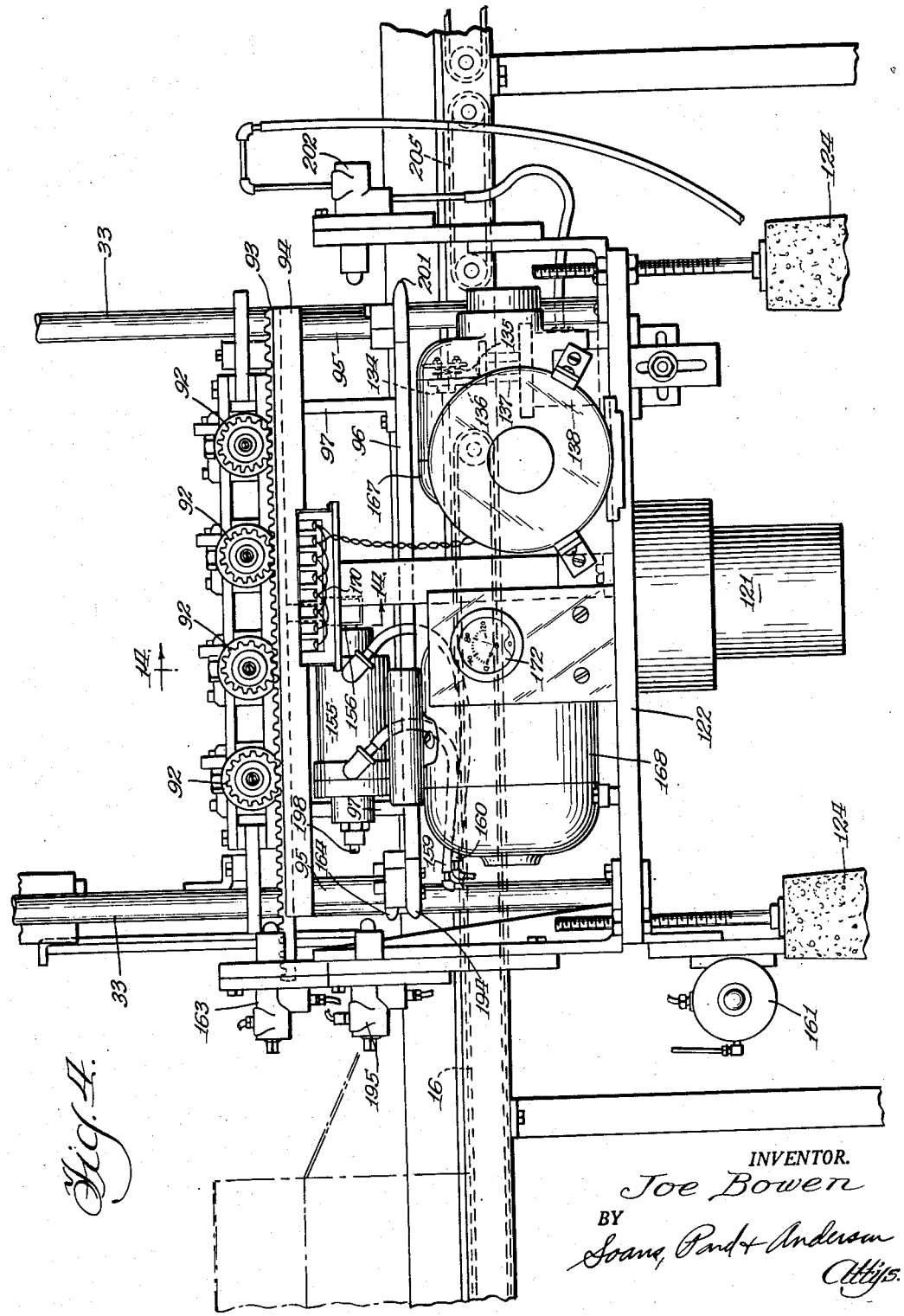

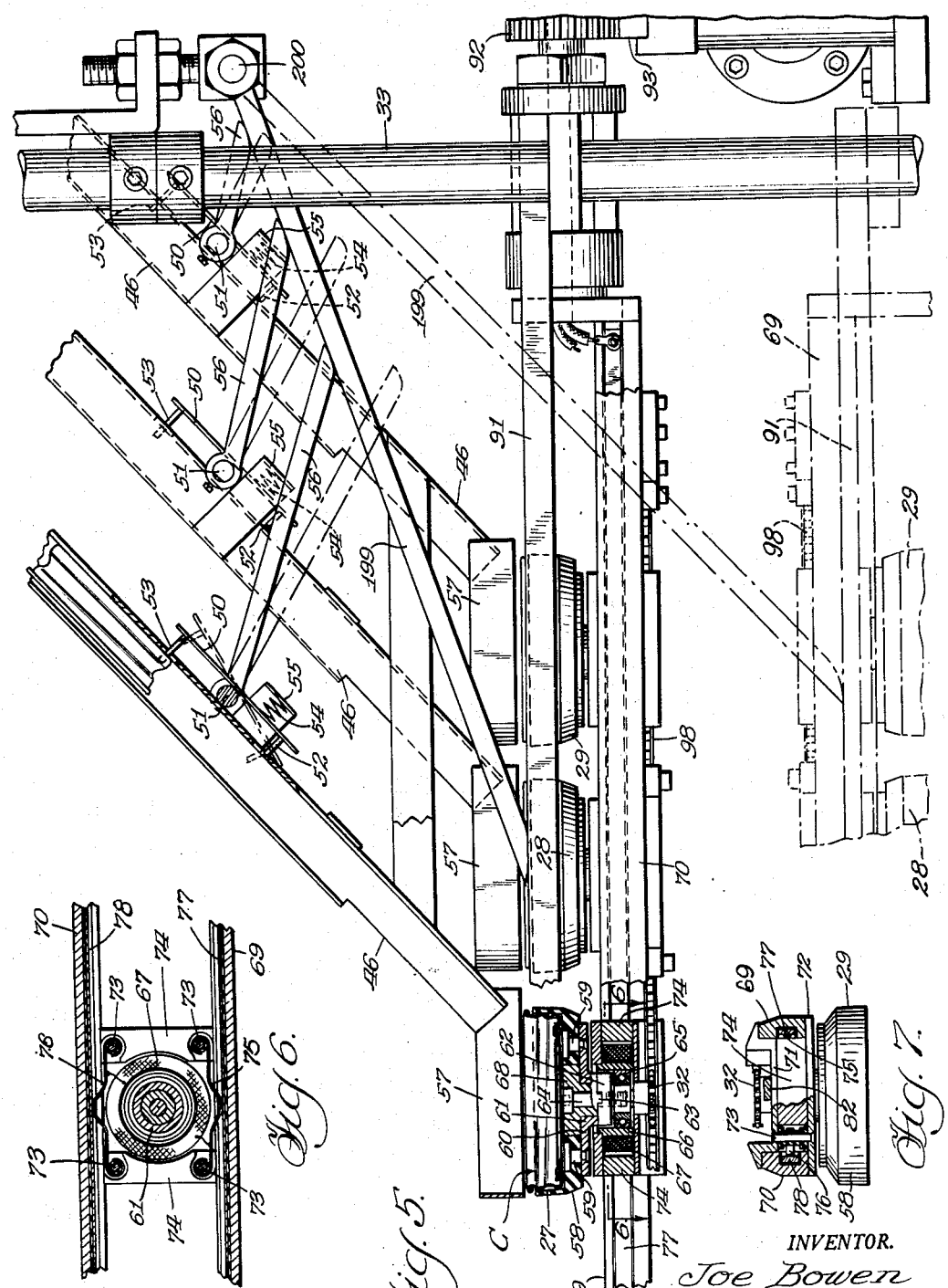

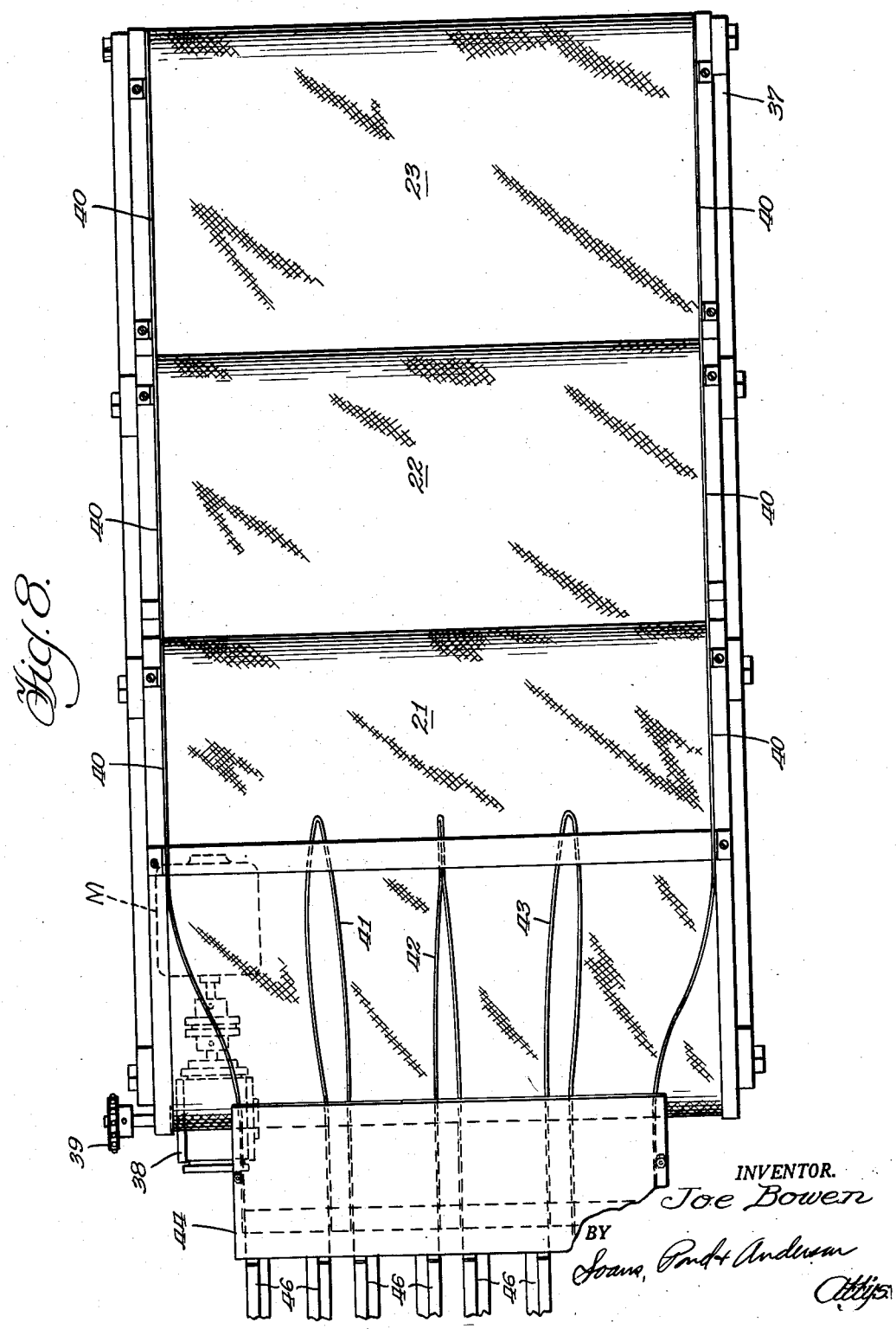

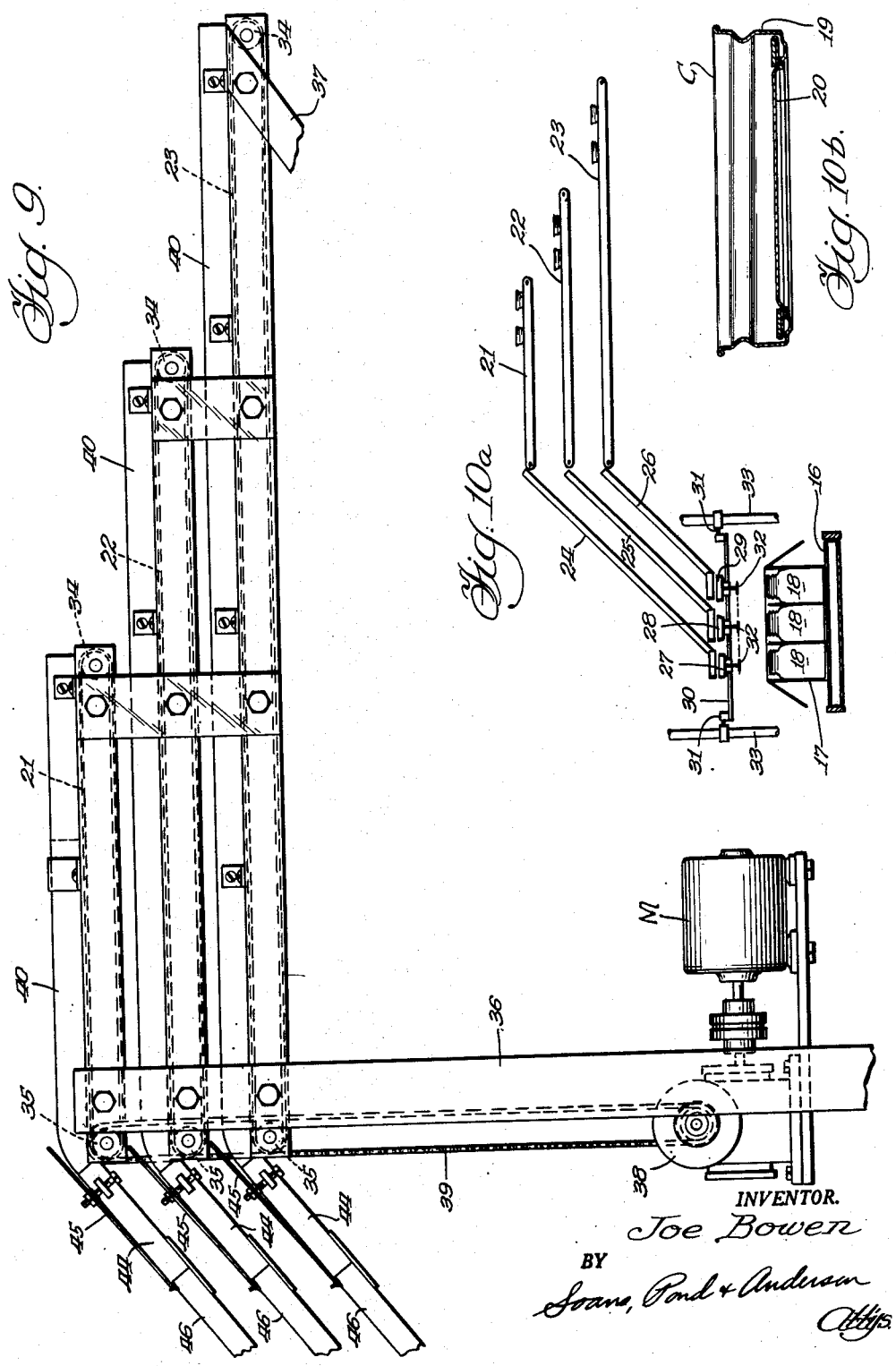

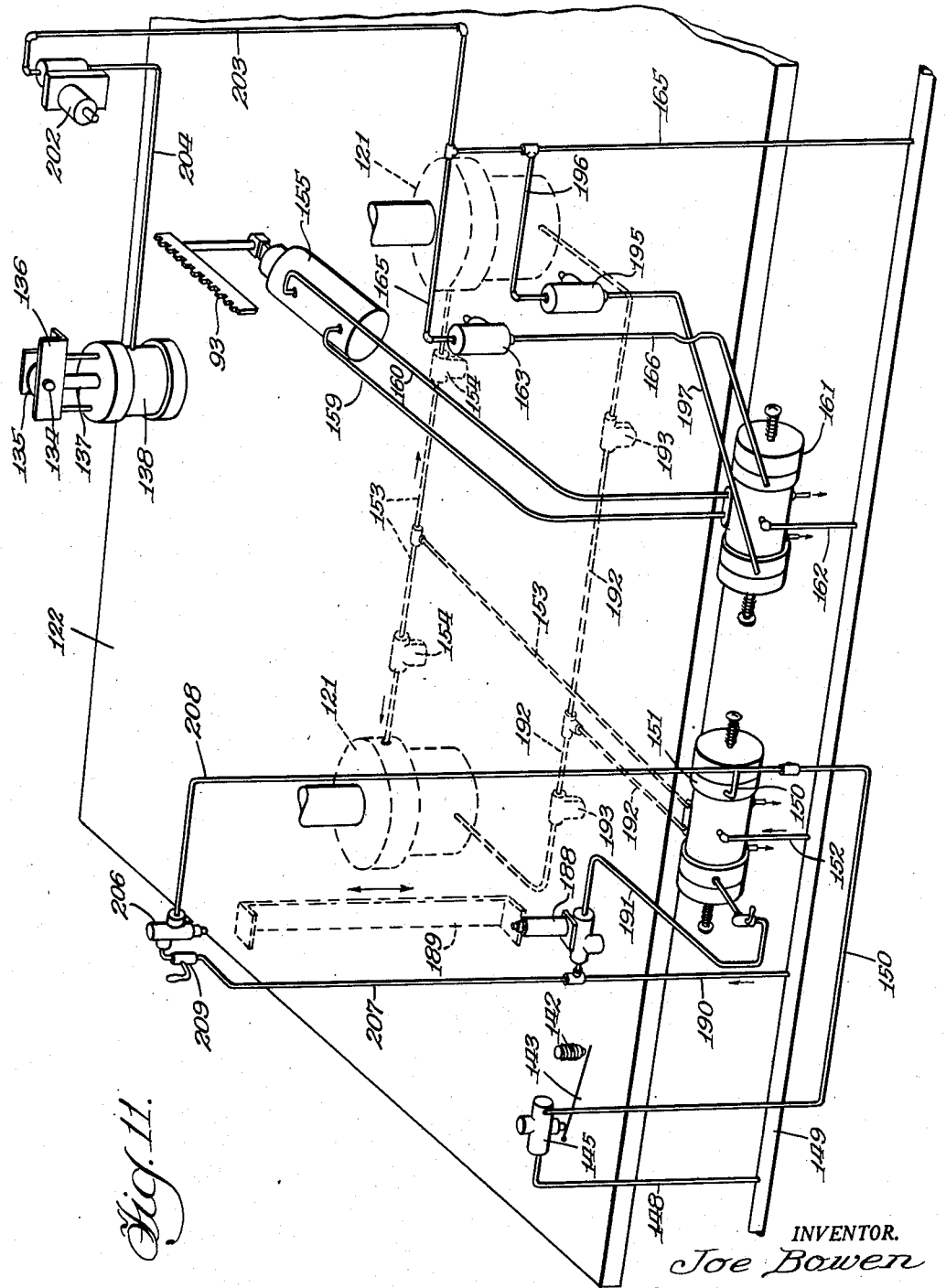

May 12, 1953  J. BOWEN  2,638,258
JAR CAPPING APPARATUS
Filed Dec. 7, 1949  10 Sheets-Sheet 9
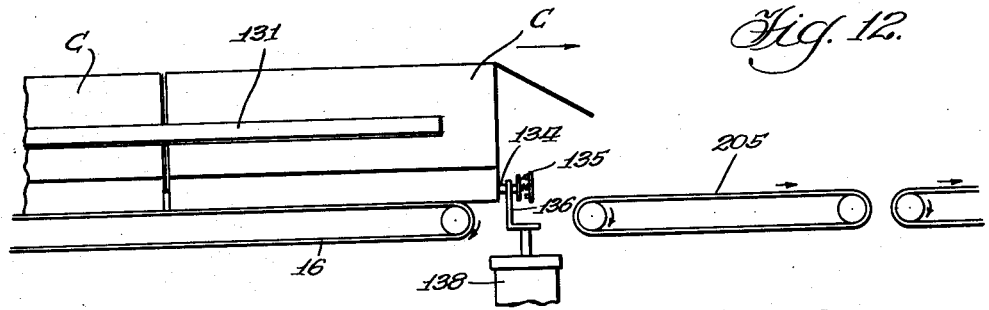
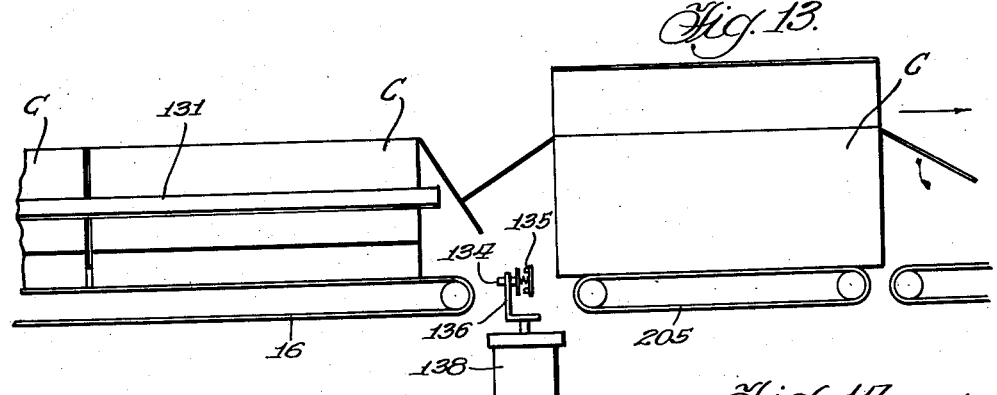
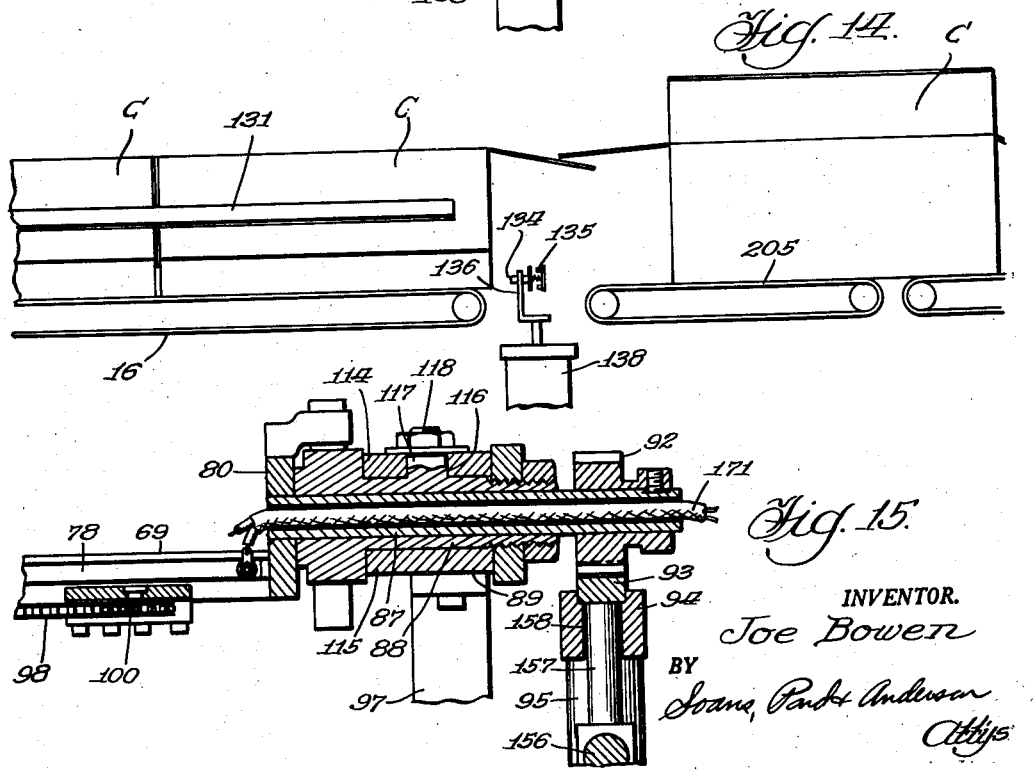
INVENTOR.
Joe Bowen
BY Soans, Pond & Anderson
Attys May 12, 1953 J. BOWEN 2,638,258
JAR CAPPING APPARATUS
Filed Dec. 7, 1949 10 Sheets-Sheet 10

INVENTOR.
Joe Bowen
BY
Evans, Pond & Anderson
Attys.

Patented May 12, 1953

2,638,258

UNITED STATES PATENT OFFICE 2,638,258

JAR CAPPING APPARATUS

Joe Bowen, Huntington, W. Va., assignor to Alexander H. Kerr and Company, Incorporated, Los Angeles, Calif., a corporation of Nevada Application December 7, 1949, Serial No. 131,604

19 Claims. (Cl. 226—88)

This invention relates to apparatus for applying caps to jars, and more especially to apparatus for applying caps to empty jars such as are typified by well-known mason jars.

Before shipping jars of the character indicated from the factory where they are made, it is the practice to apply caps, the caps being only loosely applied so that they may be readily removed when the jar reaches the customer who will fill the jar with fruit, vegetable or other material for preservation, storage, and other purposes. By applying caps to the jars before they leave the factory the interior of the jar is kept in the condition of internal cleanliness in which it leaves the factory.

The apparatus forming the subject matter of this application simultaneously applies caps to a predetermined number of jars, for example, 12 jars contained in a corrugated paper board shipping carton or the like, wherein the jars are held in a predetermined orderly relationship.

The main objects of the invention are to provide mechanism for automatically and speedily applying caps to jars; to provide mechanism whereby caps, especially screw-on caps, may be applied in a loosely attached manner so as to permit the caps to be readily removed when desired; to provide mechanism which is capable of applying two-part ring and disc caps in which the disc part is clamped to the mouth end of a jar by the ring including those in which the ring is of the screw-on type; to provide apparatus of the character indicated which will automatically deliver sets or cartons of jars and position the same in predetermined position with reference to the cap-applying mechanism so as to facilitate functioning of the latter; to provide apparatus of the character indicated which is automatically continuously operable to apply caps to successive groups or cartons of jars successively delivered to predetermined cap-applying position; to provide mechanism of the character indicated which is adjustable so as to be adapted to the application of caps to jars of different sizes and capacities; and to provide such apparatus whereby caps may be screwed on the mouth ends of jars but wherein provision is made for preventing excessive tightening of the caps on the jars.

In general, it is the object of the present invention to provide an automatic fast operating jar cap applying apparatus of the character indicated, and other objects and advantages of the invention will be understood by reference to the following specification and accompanying drawings.

In the drawings, of which there are 10 sheets,

Fig. 2 is a plan;

Figs. 3 and 4 are side elevations respectively of the left and right sides of the machine as viewed in Fig. 1;

Fig. 5 is an elevation of a portion of the mechanism appearing in Fig. 1 but showing the parts on an enlarged scale and in a changed position;

Fig. 6 is a section on the line 6—6 of Fig. 5;

Fig. 7 is a section on the line 7—7 of Fig. 2;

Figs. 8 and 9 are plan and side elevational views respectively of cap feeding mechanism, portions of which are shown also in Figs. 1, 3 and 5;

Fig. 10a is a more or less diagrammatic view illustrating the general scheme of the apparatus;

Fig. 10b is a more or less diagrammatic representation of a type of two-part cap which may be applied to jars by the present apparatus;

Fig. 11 is a piping diagram;

Figs. 12, 13 and 14 are more or less schematic illustrations of the method and operation of means for controlling the delivery of cartons of jars to the cap-applying mechanism;

Fig. 15 is a cross section on the line 15—15 of Fig. 2;

Figure 1:
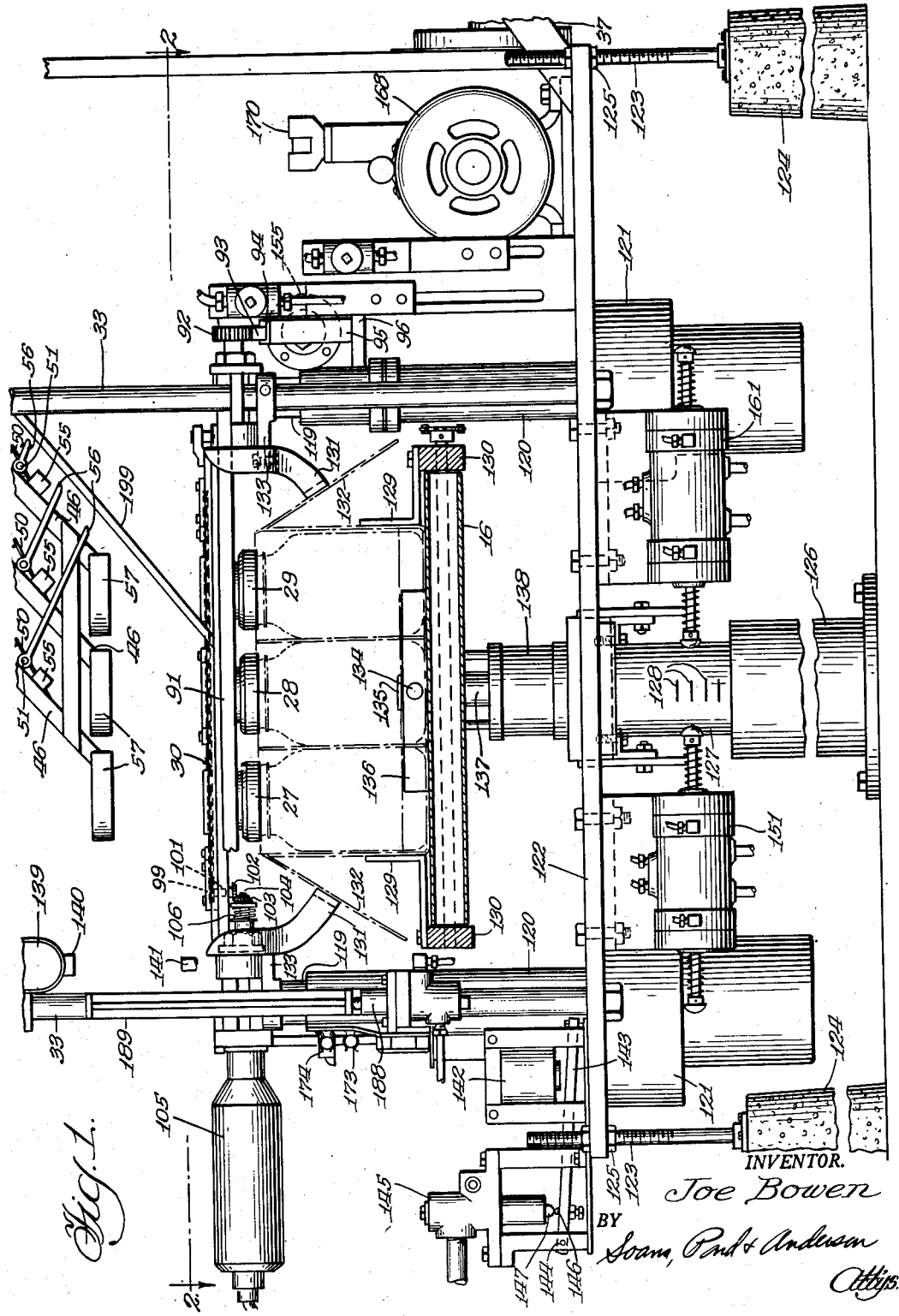
Fig. 1 is an end elevation looking at the jar entering end of the apparatus.

Referring first to Figs. 10a and 10b, there is there represented a conveyor belt 16 suitably driven and adapted for the purpose of feeding to predetermined position a carton 17 containing jars 18. The jars 18 may be new jars packed in the carton 17 for shipping purposes and the purpose of the machine is to apply caps to the open upper ends of the jars.

A now very popular type of cap is represented in Fig. 10b as comprising an annular ring member 19 and a disc member 20, these parts being separate and so formed that when the ring member 19 is screwed down on a jar, the peripheral portion of the disc member 20 will be forced into tight, leak-proof contact with the mouth end of the jar, suitable sealing composition being usually provided on said peripheral portion of the disc 20. The apparatus may also be employed for applying the more conventional one-piece metal caps which are usually lined with a glass lining disc and sealed on the jar by means of a rubber or like ring positioned between the peripheral flange of the screw threaded side wall of the cap and a shoulder portion of the jar. Caps of this latter conventional construction have the liners firmly seated therein so that such caps may be considered one-piece caps so far as handling thereof is concerned. The two-piece caps of the type shown in Fig. 10b offer special problems of handling inasmuch as the two parts are not inter-attached but are readily separable and freely movable relative to each other. As will hereinafter appear, the apparatus herein shown is capable of efficiently handling the two-part type of cap.

In the present machine, there are as represented in Fig. 10a, cap delivery means comprising upper, intermediate and lower conveyors 21, 22 and 23 respectively, which are continuously propelled. Caps may be hand or otherwise fed to the receiving end portions of the conveyors, the conveyors 22 and 23 respectively having their receiving end portions extended beyond the immediately overlying conveyor as represented in Fig. 10a, to facilitate deposit of caps thereon. The caps are propelled by said conveyors and are discharged therefrom down inclined cap chutes represented at 24, 25 and 26, which deliver the caps one by one to receptacles 27, 28 and 29 respectively. The receptacles 27, 28 and 29 are rotatably mounted in a supporting frame 30, and this frame is pivoted for turning movement on pivot shafts such as represented at 31, 31 whereby the receptacles 27, 28 and 29 may be inverted from the upwardly facing cap receiving position shown in Fig. 10a to a downwardly facing position for presenting and applying the caps to the mouth ends of the jars 18.

As above mentioned, the receptacles 27, 28 and 29 are each rotatably mounted and means are provided for rotating or spinning these receptacles when they are inverted to thereby cause the caps to be screwed on the jars. In the diagrammatic representation Fig. 10a, the receptacles are illustrated as having stems depending therefrom and journaled in portions of the frame 30 and provided with sprockets 32 which are simultaneously driven by means of a chain to thereby effect rotation of said receptacles. The receptacle-supporting frame 30 is not only pivoted for inverting movement on the pivots 31, 31 but is also vertically slidably mounted on guide posts such as represented at 33, 33 so that the receptacles 27, 28 and 29 may be lowered from cap-receiving position into proximity to the mouth ends of the jars to thereby apply the caps to said jars. Mechanism is provided for automatically initiating and terminating the various movements of the operating parts of the apparatus and also for controlling the delivery and positioning of cartons of jars in cap-receiving position.

The cap-feeding belts 21, 22 and 23 are supported by suitable conveyor rolls 34 at the receiving ends of the conveyors and similar conveyor rolls 35 at their delivery ends, said rolls being suitably journaled in a rigid frame structure supported by an upstanding post 36 and other posts or braces, a diagonal supporting brace 37 being represented in Fig. 9. Such diagonal brace may extend to any convenient part of the rigid frame structure or the post 36 to provide adequate support for the receiving ends of the conveyor structure. The conveyors 21, 22 and 23 are continuously driven by means of an electric motor M through the agency of a suitable speed reducer 38 and a chain 39 which meshes with suitable sprockets carried by the power output shaft of the speed reducer 38 and the shafts of the delivery end pulleys 35 of the conveyors (see also Fig. 3).

Caps are manually or otherwise deposited on the unobstructed end portions of the conveyors 21, 22 and 23 between suitable upstanding side guides 40 and the caps are accordingly carried forwardly to the discharge ends of the conveyors. The present apparatus is designed to simultaneously apply 12 caps to 12 jars in a carton, the jars being arranged in four rows of 3 jars. Accordingly, the caps carried forwardly by the conveyors 21, 22 and 23 are divided into four rows of caps and for this purpose there are provided suitably shaped dividers 41, 42 and 43 at the discharge ends of the conveyors, these dividers being disposed intermediate the side guides 40 so as to divide the space therebetween into four approximately equal channels. There are such dividers 41 and 42 and 43 associated with the delivery end portion of each of the conveyors 21, 22 and 23. Hence, the caps placed indiscriminately on the receiving end portions of the conveyors will be discharged therefrom in four rows. The dividers 41, 42 and 43 are supported by attachment to a tunnel-like sleeve 44 and each sleeve has a top plate 45 which is extended so as to overlie the discharge extremity of the respective conveyors 21, 22 and 23 to prevent possible overflow of the caps as they leave the conveyors to enter the sleeves 44. As represented in Fig. 8, the dividers 41, 42 and 43 traverse the width of the sleeves 44 so as to guide the four rows of caps through said sleeves.

From the sleeves 44 the caps are guided downwardly along inclined tracks or chutes 46 which are fabricated of suitable channel-shaped strips and bound together and supported to provide a rigid chute structure. These chutes may be supported by suitable brackets such as indicated at 47 which are attached at their ends to fixed supporting posts 48 and 49 (Fig. 3). These chutes are preferably adjustably attached to said supporting members 47, attachment to the post being by means of suitable sleeve-like brackets which may be adjusted up and down on the posts and locked in selected place by suitable set screws. These brackets 47 are located near the lower ends of the chutes so that the lower ends of the upper and lower chutes may be adjusted toward and from each other to adjust the spacing of the discharge ends of the chutes to conform to the spacing of various sizes of jars when packed in a carton for shipment. The chutes 46 in each set thereof are also adjustable at their lower ends toward and from each other so as to permit setting of the discharge ends of the chutes to conform to the spacing of the rows of jars to which the caps are to be delivered. This adjustment may consist in an adjustable connection between the respective chutes and their respective supporting cross members 47.

Adjacent the lower ends of the chutes there are provided escapement devices for controlling the discharge of caps. As shown best in Fig. 5, these escapement devices comprise levers or plates 50 which are pivoted intermediate their ends on pivot shafts 51 suitably journaled on the respective chutes. At the upper and lower ends of these plates 50 there are provided upwardly projecting pairs of pins 52 and 53 (see also Fig. 3). Springs indicated at 54 interposed between the bottoms of the plates 50 and suitable saddles 55 attached to the chutes and straddling the plates 50 serve to yieldingly urge the plates to rock so as to project the pins 52 into the path of caps moving downwardly in the respective chutes.

The pivot shafts 51 are continuous for each set of chutes as shown in Fig. 3 and rocking of the pivot plates 50 is automatically controlled through the agency of levers or arms such as indicated at 56, secured to the respective shafts 51. The means for actuating these arms 56 so as to rock the escapement mechanism will presently be explained.

At the lower ends of the chutes 46 there are secured annular cap guides 57 which guide the descending caps into the receptacles 27, 28 and 29 as explained in connection with the diagrammatic illustration Fig. 10a.

The receptacles 27, 28 and 29 are of like construction and, as indicated in Fig. 2, there are four rows of such receptacles, each row comprising three receptacles 27, 28 and 29. Each receptacle comprises a flexible rubber cup 58 (see Fig. 5) which is suitably attached as by riveting or otherwise as indicated at 59 to a metal flange or plate 60 which extends from a hub 61. This hub 61 abuts a spindle member 62 and is keyed thereto as indicated at 63, so that the spindle member 62 and said hub and plate 61 and 60 are rotatable as a unit but are separable from each other. These parts are normally held together by means of a screw 64 which is threaded into the member 62.

The spindle member 62 is rotatably seated through the agency of an anti-friction bearing 65 in the central opening of a sleeve or core 66 forming a part of a magnetic coil housing structure which contains an electric magnet coil or winding 67. The spindle 62 projects beyond the sleeve 66 and is provided with one of the beforementioned sprockets 32. It will be seen that by rotating the sprocket 32 and spindle 62, the plate 60 and rubber cup 58 will be also rotated. The sleeve 66, the spindle 62 and the hub 61 and plate 60 are made of suitable magnetic metal which will be magnetised when the coil 67 is energized. A cap C deposited in the receptacle 27 will be magnetically held therein incident to the magnetic attraction of the cap to the plate 60 and the rivets 59 but to improve this magnetic holding of the cap in place, a thimble or filler 68 of suitable magnetic metal is employed in the center of the structure as shown. This thimble or filler may, however, be made integral with the plate 60 if preferred.

The rows of receptacles embodying the details above described, are supported in frames 30 as aforesaid, and there are four frames for respectively supporting the four rows of receptacles as will be best understood by inspection of Fig. 2. In Fig. 2, the cap receptacles 27, 28 and 29 are shown in downwardly facing position (inverted relative to the position shown in Fig. 5). Each frame 30 comprises parallel side bars 69 and 70 between which the said magnetic coil housing structures are mounted as best shown in Fig. 7. As there shown, each of the said housing structures is confined between end plates 71 and 72 which are interconnected by rivets such as indicated at 73 (see also Fig. 6). The end plates 71 and 72 are of generally rectangular form and house the coil 67 between them, filler bars 74, 74 being provided between the plates at opposite ends of the housing. These fillers 74 are recessed as best indicated in Fig. 6 to accommodate the coil 67 and the rivets 73. The rivets 73 at opposite sides of the coil housing support contact springs 75 and 76 respectively, these springs being suitably electrically connected to the ends of the coil winding as indicated in Fig. 6.

Intermediate portions of the contact springs 75 and 76 are bulged outwardly into resilient engagement with electrical conductor strips 77 and 78 respectively, these strips being seated in grooves provided in the inside faces of the frame slide bars 69 and 70 as best shown in Fig. 7. The conductor strips 77 and 78 are suitably insulated from the metallic side bars 69 and 70 and the contact members 75 and 76 are also suitably insulated from the rivets 73 and the metallic parts of the coil housing. The end plates 71 and 72 have marginal side portions extended so as to embrace and slidably fit around the side bars 69 and 70 so that the receptacle carrier including the coil housing is capable of being adjusted to various positions along the lengths of said side bars 69 and 70. Because of the wiping contact between the contact members 75 and 76 and the respective conductor strips 77 and 78, the coil 67 will be maintained in electrical connection with said conductor strips in all positions of the receptacles relative to said side bars 69 and 70.

A cap C having been delivered into the receptacle 27 (or the receptacles 28 and 29) will be magnetically gripped and held in the receptacles by the electro-magnetic force developed when the coil 67 is energized, it being understood, of course, that the caps C or at least the disc portions 20 thereof, are made of magnetic material.

The receptacles 27 are of such internal diameter that the caps will fall freely thereinto and assume their fully seated position as shown in Fig. 5. The peripheral flange portion of the receptacles is not required to frictionally grip the annular band portion of the cap structure inasmuch as the magnetic grip on the cap is adequate for retaining the cap in the receptacle and for causing the cap to rotate with the receptacle when the latter is rotated.

Each pair of grooved bars 69 and 70 which support the sets of receptacles are rigidly interconnected at their ends by end members 79 and 80 (see Fig. 2) so that the members 69, 70, 79 and 80 constitute in effect a rigid rectangular frame. Of the three receptacles supported in each of these frames (there being four such frames as shown in Fig. 2), the intermediate receptacle carrier is fixed in place while the carriers on opposite sides of the central carrier are each mounted so as to be readily adjustable toward or from the central carrier although normally anchored in fixed position. As shown in Fig. 2, the carriers for the receptacles 29 are anchored in predetermined fixed position relative to the central carriers 28 by means of links 81 which are detachably connected at their opposite ends to the carriers for the central and end receptacles 28 and 29 respectively. Similarly, the carriages for the receptacles 27 are normally held in fixed position by means of links such as indicated at 82, which are detachably connected at their ends to the carriages for the receptacles 27 and to fixed plate structures 83 which are fixedly mounted in the respective frames.

By substituting for the links 81 and 82 links of different lengths, the carriages for the receptacles 27 and 29 may be held in different positions of adjustment relative to the centrally disposed receptacles 28. Other adjusting means may, of course, be provided. However, the link means described are advantageous in that they may be prefabricated to provide predetermined settings for the receptacles 27 and 29 in conformity with the requirements for capping jars of different sizes.

The rectangular frames 30 which carry the sets of receptacles 27, 28 and 29 are journaled at their ends so as to be capable of being rotated through an arc of at least 180° as already explained in connection with the diagram Fig. 10a. To that end and for other purposes which will presently appear, sleeves 84 are secured to and project endwise from the end members 79; these sleeves being journaled for rotation in bearings 85 which are supported in a transverse member 86. Similarly, at the opposite end of each of the rectangular carrier frames, the end members 80 have rigidly secured thereto tubular shafts 87 (see Fig. 15) which are journaled in suitable bearing structures 88, the latter being supported by a transverse member 89.

The transverse members 86 and 89 constitute members of a rectangular frame of which the other members are bars indicated at 90 and 91 (Fig. 2), these bars being suitably rigidly united at their ends to the members 86 and 89. The members 86 and 89 have end portions extended beyond the members 90 and 91 and such end portions are suitably bored and slidably fitted on vertically disposed posts or rods 33 previously referred to. Hence, the frame structure comprising the members 86, 89, and 90 and 91 and all of the invertibly supported receptacle sets are adjustable up and down along the posts 33.

For effecting turning of the receptacle frames 39 through an arc of 180°, each tubular shaft 87 is provided with a gear 92 (see Figs. 2 and 15). These gears are suitably secured to the respective shafts 87 and they mesh with a rack bar 93 which is suitably slidably mounted in a channeled guide bar 94. This guide bar 94 (and hence the rack 93) are supported in fixed relation to the vertically reciprocable frame structure by suitable posts such as indicated at 95, which extend upwardly from a plate 96, the latter being rigidly connected to the transverse end member 89 by means of brackets such as indicated at 97, so as to reciprocate therewith. The rack bar 93 is automatically reciprocated as required by means which will presently be explained.

The sprockets 32 (see Fig. 2) through which the cap receptacles 27, 28 and 29 are rotated on their own axes, are driven by endless chains such as indicated at 98, these chains having their opposite reaches in driving engagement with the opposite sides of the respective sprockets and being threaded around supporting end sprockets 99 and 100 respectively. The sprockets 99 are supported in the fixed end plates 83 on short shafts 101 which are journaled in said end plates. On the opposite side of said end plates the shafts 101 have mounted thereon bevel gears 102 (see Fig. 1) which mesh with bevel gears 103 which are carried on end portions of shafts 104 of electric motors 105. These electric motors 105 are a high speed, fractional horsepower type of motor and they are each supported by suitable attachment to the transverse member 86 of the vertically slidably mounted frame structure. The bevel gears 103 are keyed to the shafts 104 so as to be axially slidable thereon and rotatable therewith, and suitable compression springs such as indicated at 106 are provided intermediate gears 103 and fixed portions of the supporting frame structure so as to yieldingly urge the gears 103 into mesh with the gears 102. In the event of interference with the rotation of a gear 102, the spring 106 may yield so as to allow the driving gear 103 to slip over the teeth of the gear 102.

Figure 16:
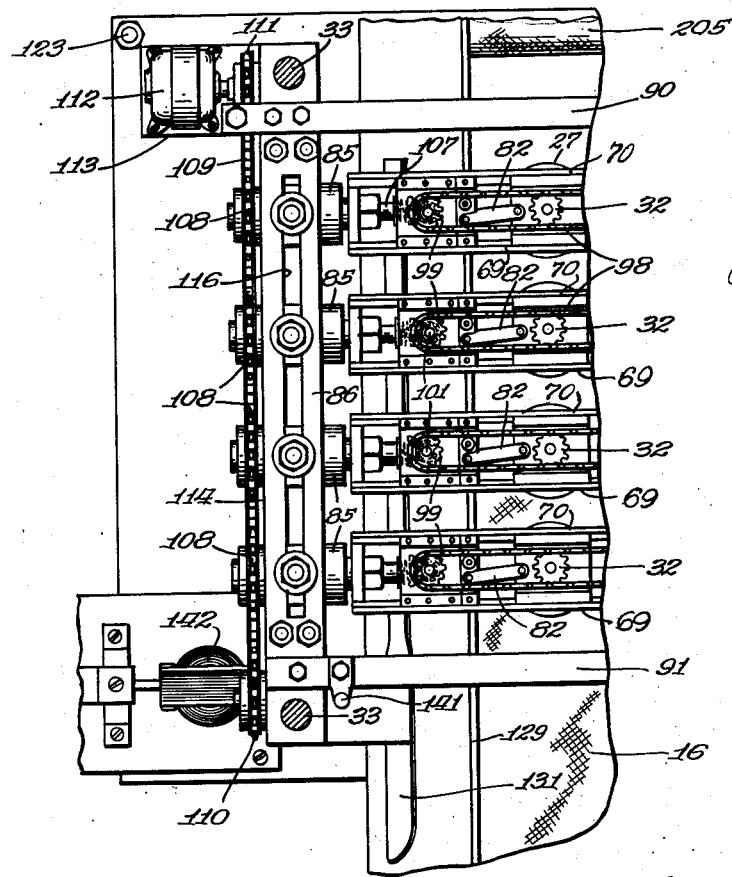
Fig. 16 is a plan corresponding to a portion of Fig. 2 but showing a modified arrangement.

Instead of employing a separate electric motor to rotate each set of receptacles the modified arrangement shown in Fig. 16 may be provided. As there shown, shafts 107 replace the motor shafts 104, the shafts 107 being suitably journaled in the frame supported bearings 85 and provided on their outer ends with sprockets such as indicated at 108. An endless chain 109 has one or both of each reaches engaged with said sprockets 108 and threaded around a supporting idler sprocket 110 and a sprocket 111 which is carried by the shaft of a small electric motor 112. This small electric motor is supported on a shelf plate 113 which is suspended from the transverse member 86 so that the motor will move up and down with the electrically movable frame structure and the idler gear 110 is journaled on the extended end portion of said member 86 as shown. In this arrangement, a single driving motor and a chain and sprocket drive replace the four independent motor drives shown in the Fig. 2 arrangement.

As already explained, carriers for the receptacles 27 and 29 are adjustable toward and from the carrier for the central receptacle 28 of each set. This provides adjustment of the receptacles in one direction to accommodate the machine to the capping of various sizes of jars. To permit adjustment of the cap receptacles in the other direction toward and from each other, or in other words, to permit adjustment of the sets of receptacles toward and from each other, the bearing members 85 and 88 at opposite ends of the invertible frames are mounted for adjustment toward and from each other in said transverse members 86 and 89. To that end the members 86 and 89 are formed of upper and lower parallel bar portions 114 and 115 (see Fig. 15) between which the bearings are slidable toward and from each other. The upper bar 114 is longitudinally slotted as indicated at 116 to receive lugs such as indicated at 117 which project upwardly from the respective bearing members 85 and 88, and these lugs are extended upwardly in the form of screw threaded studs 118 which receive clamping nuts and washers as indicated in Fig. 15, whereby the respective bearings may be locked in selected position of adjustment in the members 86 and 89. It will be observed that this adjustment of the receptacle sets toward and from each other is permitted without interfering with the operative connections between the motors 105 and the receptacle rotating means and without interfering with the operative connections which effect inversion of the receptacles.

The vertically slidably mounted carrier frame comprising the parts 86, 89, 90 and 91 and the various parts carried thereby are supported on the upper ends of a pair of piston rods 119 (see Figs. 1 and 3) which extend out of suitable guide sleeves 120 which are connected to cylinders 121. The piston rods 119 extend into said cylinders 121 and are provided with pistons therein so that, upon delivery of pressure fluid (compressed air or liquid under pressure) into the cylinder on either side of the piston, said frame structure will be moved up or down.

The supporting posts or rods 33 extend upwardly from a bed plate 122 which is vertically adjustably supported on screw posts 123 which extend upwardly from a suitable base structure, here typified as comprising concrete piers 124. The conveyor 16 for the cartons of jars is preferably a normally fixed structure, this conveyor extending from some suitable loading point into the capping machine. In preference to providing vertical adjustment for this conveyor to accommodate the machine to the capping of jars of various heights, the cap placing structure is in its entirety mounted for adjustment up or down relative to said conveyor. Hence, the supporting bed plate 122 is vertically adjustably mounted as aforesaid on means such as the screw posts 123. While adjustment of the capping mechanism may be effected up or down by simply adjusting supporting nuts such as indicated at 125 up or down on the screw posts and correspondingly adjusting overlying locking nuts, it is preferable to provide power means for effecting such adjustment. Accordingly, there is provided a cylinder 126 having a piston 127 which extends out of the cylinder and is secured at its upper end to the bed plate 122 as best shown in Fig. 1. By delivering pressure fluid into or releasing pressure fluid from the cylinder 126, the piston 127 and the mechanism in its entirety may be adjusted up or down relative to the conveyor 16. If desired, the piston 127 may be provided with gauge marks such as indicated at 128, to indicate various predetermined settings to satisfy the requirements of jars of various predetermined heights.

Cartons of jars are guided against sidewise displacement on the conveyor 16 by side guides 129 which are adjustably secured to side rail portions 130 of the conveyor structure. Suitable flap controlling bars 131 are provided for controlling the carton top flaps represented at 132 in Fig. 1, that is to say, to hold said flaps in an outwardly and downwardly extending position during the passage of the carton through the capping apparatus. These flap guides 131 may be supported in any suitable manner, as for example, by being attached to the stationary posts 33 through the agency of supporting brackets such as indicated at 133. The flaps at the leading and trailing ends of the cartons are controlled by being initially folded downwardly over the outside faces of the respective end walls of the cartons so that these flaps are held in an out of the way position between the adjacent ends of adjacent cartons as indicated in Figs. 12, 13 and 14.

Operation of the apparatus is initiated when a carton of jars arrives in capping position by engagement of the leading end of the carton with a switch button 134 of an electric switch 135 which is carried on an angle iron member 136 (see Figs. 2 and 4) which is, in turn, supported on the upper end of a piston rod 137. The piston rod 137 extends into a cylinder 138 and is equipped with a piston so that the piston rod and the switch structure may be raised and lowered by the injection and relief of pressure fluid into and from said cylinder 138. When the mechanism is set into operation, the switch 135 is in an elevated position so that its button 134 is above the plane of the conveyor 16, thereby enabling the leading end of a carton of jars to engage said switch button and close the switch 135. The switch 135 is connected in series with another switch 139 (see Figs. 1 and 3) and this switch 139 will, at the start of operations, be closed by engagement of its operating button 140 with an actuating finger 141 which projects upwardly from a portion of the vertically reciprocable frame member 91.

As shown in Figs. 1 and 3, the vertically reciprocable frame structure is in its lowered position so that the actuating finger 141 is out of engagement with the switch button 140. However, it will be understood that when the frame structure is elevated into the cap receiving position (in which it is shown in Fig. 5), said finger 141 will engage said switch button 140 and effect closing of the switch 139. Through the switches 135 and 139 a circuit is completed to an electric magnet or solenoid 142 (Figs. 1 and 2) whereby said magnet or solenoid is energized and caused to rock upwardly an arm 143 which is pivoted at one end as indicated at 144 on a suitable bracket structure which is carried by a plate member secured to the bed plate 122.

When the armature arm 143 is rocked upwardly a valve 145 is opened incident to engagement of a screw member 146 carried by the arm with the actuating plunger pin 147 of the valve. The valve 145 is connected in a pipe line 148 which extends from a compressed air (or other pressure fluid) supply pipe 149 (see Fig. 11) and controls the delivery of such pressure fluid through a pipe line 150 into one end of a reciprocating valve structure 151. When the valve is actuated by air delivered thereto through the pipe line 150, compressed air will be permitted to flow from the supply pipe 149 through a pipe line 152, through the valve 151 and a pipe line 153, suitable pressure equalizing air control valves 154 and into the upper end portions of the cylinders 121. The pressure fluid thus delivered into the upper portions of the cylinders 121 will cause the cap-carrying frame structure to be moved downwardly from the cap-receiving position illustrated in Fig. 5, to the cap-applying position substantially as shown in Fig. 1.

It may be observed that by providing the switches 135 and 139 in series, the delivery of a carton of jars to capping position would not set the mechanism in operation in the event that the cap-carrying structure were not in its normal elevated starting position. This precautionary measure is desirable to the end that no automatic operation of the machine be performed unless it is certain that all of the cap-carrying receptacles have been loaded with caps and this is practically assured in the described mechanism provided that the carrying mechanism be elevated to cap-receiving position before starting downward movement of the cap-applying structure.

As soon as downward movement of the cap-applying structure is initiated, the rack 93 is actuated to turn the cap-carrying receptacles from upwardly facing cap receiving position to downwardly facing cap-applying position. This rack is actuated by a pneumatic cylinder 155 which has a piston 156 provided with a laterally upwardly extending pin 157 (see Figs. 4 and 15) which is connected to the rack 93. The guide bar 94 is slotted as indicated at 158, to permit the pin 157 to move laterally in said supporting bar so that the piston 156 and rack 93 will be reciprocated in accordance with the admission of pressure fluid into the opposite ends of the cylinder 155.

The opposite ends of the cylinder 155 are connected by suitable conduits 159 and 160 to a valve 161 (see Figs. 4 and 11), the latter having a connection 162 to the pressure fluid supply line 149. The valve 161 is actuated at the beginning of the down movement of the cap-carrying structure incident to the opening of a valve 163 by means of a member 164 which is carried by the vertically moving shelf member 96 of the cap-carrying structure.

The valve 163 is connected through a pipe line 165 with the pressure fluid supply line 149 and a pipe line 166 with the valve 161 so that when said valve 163 is opened, pressure fluid will be admitted to one end of the valve 161 to thereby cause the latter to admit pressure fluid to the motor cylinder 155 so as to actuate the rack bar to turn the cap-carrying frames as already explained.

Also, upon initiation of the downward movement of the cap-carrying structure or, at least, when the cap-carrying receptacles have been turned to their downwardly facing position, the motors 105 (Fig. 2) are energized (or the motor 112, Fig. 16, is energized) to effect rotation of the cap-carrying receptacles. Also, at the start of the downward and turning movement of the cap-carrying devices, the windings 67 in the cap-carrying receptacle housings are energized so as to effect magnetic holding of the caps in the receptacles. Electric current for the purpose of energizing these magnetic devices is provided by means of a direct current generator 167 (Figs. 2 and 4) which is driven by a direct connected electric motor 168.

The generator 167 is connected through a suitable rheostat 169 to a suitable bridging block 170. From the bridging block 170 suitable electrical conductors 171 are carried through the tubular shafts 87 and connected to the contact strips 77 and 78 from which the windings 67 receive current through the spring contact members 75 and 76 as shown in Figs. 6 and 7. The rheostat 169 serves to control the voltage delivered from the generator 167 to the cap magnet coils and an appropriate volt meter 172 may be provided for facilitating regulation of said voltage. The motor 168, generator 167, bridging block 170, and volt meter 172 are fixedly mounted on the base plate 122 and the conductors extending from the bridging block into the tubular shafts 87 are of suitable flexible construction to permit vertical reciprocation of the cap-carrying structure.

The feed of current to the cap-holding magnets is controlled by means of a switch or circuit breaker in the conductor which carries current from the generator 167 to the bridging block 170. This switch is indicated at 173 (Figs. 3 and 17) being in this instance a mercury switch. Similarly, the operation of the motors 105 or the motor 112 which effects rotation of the cap-carrying receptacles is controlled by a switch 174 which is associated with the switch 173 and connected in the conductor which supplies current to the said motors 105 or motor 112.

Figure 17:
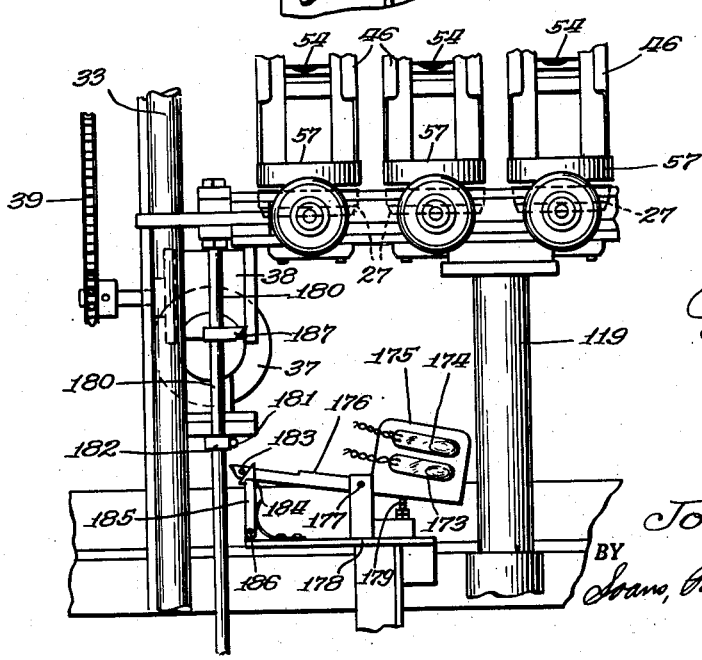
Fig. 17 is a fragmentary side elevation corresponding to a portion of Fig. 3 but showing the parts in a changed position.

The mercury switches 173 and 174 are mounted on an enlarged end portion 175 of a lever 176 which is pivotally mounted intermediate its ends as indicated at 177, on a suitable stationary bracket structure 178. An adjustable stop member 179 is provided for limiting the downward rocking movement of the switch-carrying portion of said lever. The other end portion of said lever 176 projects into proximity to a rod 180 which is secured to and depends from a portion of the vertically reciprocating cap-carrying structure and said rod is equipped with a pair of trip members 181 and 187. In the starting position, the switches 173 and 174 are open and inclined downwardly and to the right as shown in Fig. 17, with the lever 176 extending angularly upwardly to the left. When the cap-carrying structure starts downwardly, the tripping pawl 181 engages the adjacent underlying end portion of the lever 176 and effects downward rocking of the lever on its pivot 177 until a pin 183 carried by the end of the lever 176 engages under a shoulder 184 on a latch 185 which is pivotally mounted on the bracket 178 as indicated at 186.

The pawl 181 is yieldingly mounted in the mounting block 182, so that when the lever 176 reaches its down position where it is stopped as illustrated in Fig. 3, said pawl will yield and be retracted to permit the pawl to pass the end of the lever 176. The latch 185 holds the lever 176 in the position illustrated in Fig. 3, in which the switches 173 and 174 are closed to thereby complete the respective electrical circuits in which they are connected. Hence, during the downward movement of the cap-carrying structure, the cap-holding magnets remain energized and the cap rotating motor or motors are kept in operation. As the cap-carrying receptacles reach the mouth ends of the jars with which they are in vertical alignment, the caps will be deposited and screwed on the respective jars. Because of the slipping clutch action of the magnetic grip on the caps, it is not necessary to attain any critical relationship between the speed of rotation of the caps and the rate of downward movement of the caps. It is merely important that the speed of rotation be adequate to screw the caps on to cause them to move downwardly at least as fast as they are carried downwardly by the carrying structure.

When the cap-carrying structure reaches its lowermost position, the latch 185 is rocked outwardly so as to release the lever 176 thereby to permit the lever to rock back to the open switch position shown in Fig. 17. Such return rocking movement of the lever may be spring effected but because of the unbalanced construction of the lever as shown in Figs. 3 and 17, gravity action is sufficient to cause such return rocking movement. Release of the latch 185 is effected by means of the trip member 187 which is carried by the rod 180 and provided with a cam face adapted to engage a corresponding cam face on the latch as shown in Fig. 3. By this means, the magnetic grip of the receptacle magnets on the caps is terminated at the end of the cap-applying operation as is also the rotary movement of the cap-carrying receptacles.

Upward or return movement of the cap-carrying structure is automatically initiated through a control valve 188 (Figs. 3 and 11) which is actuated by a trip member 189 fixedly mounted on the vertically reciprocating structure. Said trip member may be vertically, adjustably secured to the carrying structure so as to permit accurate adjustment of the extent of downward movement which will be imparted to the structure or, as an alternative, the valve 188 may be vertically, adjustably mounted on the adjacent supporting post 33 to permit similar control.

The valve 188 controls the passage of pressure fluid from the supply pipe 149 through a pipe line 190 (Fig. 11) and a pipe line 191 into the valve 151 for effecting shifting of the valve 150 so as to cut off the flow of pressure fluid into the upper end of the cylinders 121 and to establish flow of pressure fluid into the lower ends of said cylinders 121.

As shown in Fig. 11, the lower ends of the cylinders are connected through a pipe line 192, the valve 151 and pipe line 152 to the pressure supply conduit 149. Suitable pressure control air equalizing valves 193 are preferably provided in the pipe line 192 immediately ahead of the cylinders 121. It will be seen that when the vertically reciprocating cap-carrying structure reaches its predetermined low point, upward movement will be automatically initiated to return the cap-carrying structure to its uppermost, cap-receiving position.

As the upward or return movement of the cap-carrying structure proceeds, a trip 194 (see Figs. 2 and 4) on the vertically reciprocating structure actuates a valve 195 which controls the delivery of pressure fluid from the supply conduit 149, through a portion of the pipe line 165, a pipe 196 and a pipe 197 to the pneumatic valve 161. When the valve 195 is opened pressure fluid is delivered to said valve 161 so as to adjust the same to permit pressure fluid to flow through said valve 161 and the pipe line 160 into the cylinder 155 whereby the rack 93 is returned to its starting position, thereby again effecting turning of the cap-carrying receptacles from their downwardly facing cap delivering position to their upwardly facing cap-receiving position. The extent of travel of the rack 93 may be controlled by suitable stop means embodied as indicated at 198 (Fig. 4), in the cylinder 155 or in any other suitable manner.

The trip 194 is pivoted on its supporting bracket so that on downward movement of the cap-carrying structure, the trip will be displaced by its engagement with the valve 195 and pass the valve without opening it. However, on upward movement, the trip 194 is suitably stopped against rocking so that said valve 195 will be opened to effect movement of the rack 93 and return of the cap-carrying receptacles to upwardly facing position as already explained. Similarly, the trip 164 is pivoted so that on downward movement of the cap-carrying structure, the valve 163 will necessarily be opened whereas, on upward movement of the cap-carrying structure the trip 164 will be rocked on its pivot and displaced by engagement with the valve 163 so as to pass the valve without opening it.

As the cap-carrying frame moves upwardly, its side member 91 engages the free end of an arm 199 (see Fig. 5) which is pivotally mounted at its other end as indicated at 200, on a support attached to one of the supporting posts 33. This arm 199 is thereby caused to rock upwardly and it is in such position that its upper face will engage the free ends of the arms 56 of the cap delivery escapement mechanism. By examination of Fig. 5, it will be seen that this rocking arm device 199 acts through the arms 56 to rock the cap escapement in such a manner that as the cap receptacles reach their elevated positions as shown in Fig. 5, the escapement mechanism will be rocked to withdraw the cap holding pins 52 so as to permit caps to continue their downward movement in the chutes 46 by which they are delivered into the receptacles 27, 28 and 29.

The rear escapement pins 53 are, of course, projected into the path of travel of the caps following those which are released by the front pins 52 so that only the caps at the front ends of the chutes are permitted to move downwardly. On the next downward stroke of the cap-carrying structure the escapement mechanism will be reversely actuated so as to cause the rows of caps in the chutes to move downwardly until stopped by the front escapement pins 52. Hence, there is an automatic feed of caps one by one from the chutes 46 into the cap receptacles, this cap feed being operated as an incident to the reciprocation of the cap-applying mechanism.

The switch 135 and its mounting bracket 136 are automatically lowered as an incident to the upward movement of the cap-carrying devices after completion of a cap-applying operation. As shown in Figs. 2 and 4, the vertically reciprocating structure is provided with a suitable trip member 201 which is operative to actuate a valve 202 fixedly mounted on the bed plate 122 or a suitable bracket carried thereby. Said valve 202 controls the delivery of pressure fluid (see Fig. 11) from the supply line 149 through a part of the pipe line 165 and through piping 203 and 204 to the cylinder 138 which controls the movement of the piston 137 on which the switch 135 is mounted.

The trip 201 is pivoted on its supporting structure in such a manner when the vertically reciprocating mechanism moves downwardly the trip will be rocked out of the way by engagement with the valve 202. On upward movement of the vertically reciprocating structure the trip 201 is held against rocking movement when engaging the valve 202 so that the latter will be opened, this valve being accordingly opened only shortly after the upward movement of the cap-carrying structure is started. When the valve 202 is opened by the trip 201, pressure fluid is admitted to the upper portion of the cylinder 138 so as to thereby effect rapid downward or retracting movement of the switch 135 whereby said switch is lowered below the path of travel of the jar-carrying cartons C.

After the jars in a carton are capped, the carton containing such jars is advanced by the conveyor 16 to a continuation conveyor 205 (see Figs. 12, 13 and 14) which is driven at a somewhat higher speed than the conveyor 16. The switch 135 is located intermediate the discharge and receiving ends of the conveyors 16 and 205 and permits the carton containing a set of capped jars to be advanced from the conveyor 16 to the conveyor 205 during the interval that pressure fluid is delivered into the upper portion of the cylinder 138. As the weight of the jar-containing carton is transferred from the conveyor 16 to the conveyor 205, the latter conveyor is operative to pick up said carton and advance it at a greater speed of travel than that imparted by the conveyor 16 so that carton separation will occur approximately as indicated in Figs. 13 and 14.

In the time interval in which a space exists between the cartons, the switch 135 is returned upwardly, this being effected by spring means enclosed within the lower portion of the cylinder. The switch is retracted to a position somewhat below the plane of the bottoms of the cartons so that slow spring-effected return movement may begin as soon as the compressed air is relieved from the cylinder. In the event the switch structure engages the bottom of an overlying carton, the carton continues its travel, holding the switch against further upward movement until the carton has completely passed the switch structure. It will be observed that the weight of the jar filled cartons is adequate to resist the spring force which effects upward movement of the switch. The valve 202 is a self-closing valve which upon closing, vents the compressed air from the cylinder 138 so as to permit the spring means contained therein to urge the valve to its operative position in the path of travel of the cartons. The switch 135 is thus automatically moved upwardly into the space between the cartons as shown in Fig. 13. Hence, by the time that the next succeeding carton reaches the switch 135, the latter will be in its normal operating position substantially as represented in Fig. 14. The cycle of operations is then completed and the incoming carton engages and closes the switch 135 to start a new cap-applying cycle of operations.

In the diagram Fig. 11 and on Fig. 3, there is illustrated a valve 206, this valve being adapted to be opened by the upper end portion of the trip bar 189 when the cap-carrying structure reaches its upper limit of movement. The valve 206 is connected by piping 207 to the pressure fluid supply line 149 and by piping 208 and 150 to the valve 151. When the valve 206 is opened pressure fluid will flow through said valve and the pipes 208 and 150 and through the valve 151 and pipe line 153 into the upper portions of the cylinders 121 so as to thereby automatically stop upward movement of the cap-carrying structure and initiate downward movement thereof. When certain carton controls other than the described switch 135 are employed, the valve 206 may be employed in cooperation with the valve 188 to produce automatic changes in the direction of travel of the cap-carrying structure. This valve arrangement may be advantageously employed for test operation of the apparatus in the absence of cartons of jars. Manually operable valves such as indicated at 209 (Fig. 11), may be provided wherever desired in the piping system. This valve arrangement may also be employed in certain arrangements in which the capping operation is synchronized with the feed of the jars, especially where long, continuous runs of jars are to be capped.

The apparatus described is largely in the form in which it has been initially constructed and it is accordingly subject to many refinements in the construction of additional units. The described apparatus is, however, practicably operative and efficiently functions to simultaneously apply caps on sets of jars contained in cartons fed thereto successively in the arrangement described.

The mechanism may readily be operated at various speeds up to about 48 cycles per minute in the form illustrated. However, refinements in the construction of a machine in the cap-feeding mechanism and in the carton-feeding mechanism will probably enable the apparatus to be operated at considerably higher speeds. Many such refinements and various changes in the described structure may be made while retaining the principles of the invention as herein shown and described.

I claim:

1. Jar capping apparatus comprising means for supporting a plurality of jars in predetermined arrangement, a cap carrier mounted for vertical movement toward and from said jars, said cap carrier comprising a frame, a plurality of cap receptacles mounted on said frame for turning movement from upwardly facing cap-receiving position to downwardly facing cap-discharging position and for rotary movement, said receptacles being arranged to position caps in the predetermined arrangement of said jars, and means for moving said carrier into proximity to and from said jars, means for inverting said receptacles so as to present the caps therein to said jars, and means for effecting rotation of said receptacles and the caps therein so as to thereby cause screw caps to be screwed on the jars.

2. Jar capping apparatus of the class described, comprising a conveyor for successively delivering to a predetermined position, each of a succession of cartons each containing a plurality of jars in predetermined arrangement, said conveyor having a discharge end in proximity to said predetermined carton position, carton stop means adjacent said discharge end of the conveyor normally disposed in the path of movement of cartons advanced by said conveyor and mounted so as to be retractable to a position below the path of travel of cartons discharged from said conveyor, a cap carrier mounted for vertical reciprocation into proximity to, and from said predetermined carton position, means for effecting such reciprocation of said cap carrier, means for effecting application of caps carried by said carrier to jars in a carton in said predetermined position as an incident to downward movement of said cap carrier, means for initiating downward movement of said carrier as an incident to an engagement of said retractable stop means by a carton, and means for effecting retraction of said stop means upon completion of a capping operation, thereby permitting the said conveyor to discharge cartons containing capped jars.

3. Jar capping apparatus of the class described, comprising a conveyor for successively delivering to a predetermined position, each of a succession of cartons each containing a plurality of jars in predetermined arrangement, said conveyor having a discharge end in proximity to said predetermined carton position, carton stop means adjacent said discharge end of the conveyor normally disposed in the path of movement of cartons advanced by said conveyor and mounted so as to be retractable to a position below the path of travel of cartons discharged from said conveyor, a cap carrier mounted for vertical reciprocation into proximity to, and from said predetermined carton position, means for effecting application of caps carried by said carrier to jars in a carton in said predetermined position as an incident to downward movement of said cap carrier, means for initiating downward movement of said carrier as an incident to an engagement of said retractable stop means by a carton, means for effecting retraction of said stop means upon completion of a capping operation, thereby permitting the said conveyor to discharge cartons containing capped jars, means for receiving said carton and withdrawing the same from said conveyor at a speed which is greater than the speed of travel of said conveyor, whereby the discharged carton will be separated from the next succeeding carton, and means for returning said stop means to operative position in the space between the separated discharged and incoming cartons.

4. In jar capping apparatus of the class described, a vertically movable mounted cap carrier comprising an initially upwardly facing receptacle adapted when the carrier is in elevated position to receive a cap, means mounting said receptacle on said carrier for rotary movement and for turning from upwardly facing cap-receiving position to downwardly facing cap-applying position, means for effecting movement of said carrier from an elevated cap-receiving position to a lowered cap-applying position, means carried by said carrier for effecting turning and rotation of said receptacle, and means for initiating said rotation and turning movements during an initial portion of the downward movement of said carrier to cap-applying positions, for stopping the rotation of said receptacles upon completion of said downward movement, and for restoring said receptacles to upwardly facing cap-receiving position during the upward return movement of the carrier to cap-receiving position.

5. In jar capping apparatus of the class described, a vertically movably mounted cap carrier comprising an initially upwardly facing receptacle adapted when the carrier is in elevated position to receive a cap, means mounting said receptacle for rotary movement and for turning from upwardly facing cap-receiving position to downwardly facing cap-applying position, means for effecting movement of said carrier from an elevated cap-receiving position to a lowered cap-applying position, means carried by said carrier for effecting turning and rotation of said receptacle, means for initiating said rotation and turning movements during an initial portion of the downward movement of said carrier to cap-applying positions, for stopping the rotation of said receptacles upon completion of downward movement, and for restoring said receptacles to upward facing cap-receiving position during the upward return movement of the carrier to cap-receiving position, cap feeding means for delivering caps to said receptacle, and means for actuating said cap-delivering means upon return of said receptacle from cap-applying position to cap-receiving position.

6. In jar capping apparatus of the class described, a cap carrier comprising an outer frame, an inner frame pivotally mounted on said outer frame for turning movement, a plurality of cap receptacles rotatably mounted on said inner frame, means for turning said inner frame so as to invert receptacles carried thereby from upwardly facing cap-receiving position to downwardly facing cap-applying position, and means for effecting rotation of said receptacles when in their downwardly facing cap-applying position.

7. In jar capping apparatus of the class described, a cap carrier comprising an outer frame, an inner frame pivotally mounted on said outer frame for turning movement, a plurality of cap receptacles rotatably mounted on said inner frame, means for turning said inner frame so as to invert receptacles carried thereby from upwardly facing cap-receiving position to downwardly facing cap-applying position, and means for effecting rotation of said receptacles when in their downwardly facing cap-applying position, certain of said receptacles being adjustably mounted on said inner frame so as to facilitate adjustment of the spacing between said receptacles to correspond to the spacing of various sizes of jars to be capped.

8. In jar capping apparatus, a cap carrying structure comprising an outer frame, a plurality of inner frames pivotally mounted on said outer frame, a plurality of receptacles mounted on each of said inner frames, one of said receptacles being mounted on said inner frame for adjustment relative to another thereon and one of said inner frames being mounted on said outer frame so as to be adjustable relative to another thereof, thereby to facilitate adjustment of said cap-carrier to position said cap-receptacles in conformity to the spacing of jars of various sizes.

9. In jar capping apparatus, a cap carrying structure comprising an outer frame, a plurality of inner frames, a plurality of inner frames pivotally mounted on said outer frame, a plurality of receptacles mounted on each of said inner frames, said receptacles being mounted for adjustment relative to each other on said inner frames and said inner frames being mounted on said outer frame so as to be adjustable relative to each other, thereby to facilitate adjustment of said cap carrier to position said cap-receptacles in conformity to the spacing of jars of various sizes, means for effecting turning of said inner frames so as to invert said receptacles from upwardly facing cap-receiving position to a downwardly facing cap-applying position, and means for effecting rotation of said receptacles when in said cap-applying position.

10. In jar capping apparatus, a cap carrying structure comprising an outer frame, a plurality of inner frames pivotally mounted on said outer frame, a plurality of receptacles mounted on each of said inner frames, said receptacles being mounted for adjustment relative to each other on said inner frames and said inner frames being mounted on said outer frame so as to be adjustable relative to each other, thereby to facilitate adjustment of said cap-carrier to position said cap receptacles in conformity to the spacing of jars of various sizes, an electro-magnetic means associated with each of said receptacles for magnetically holding caps in said receptacles when in downwardly facing position.

11. In jar capping apparatus of the class described, an outer frame structure, an elongated inner frame structure having substantially parallel elongated side members, a cap receptacle, means mounting said receptacle on said inner frame side members so as to permit adjustment of said receptacle longitudinally of said inner frame, electro-magnetic means associated with said receptacle for magnetically holding a cap in said receptacle, electrical conductor strips carried by but insulated from said inner frame side members, contact members carried by said receptacle mounting means for slidably contacting said conductor strips, flexible electrical conductor wires connected to said conductor strips for delivering electrical current to said strips, and means for alternately turning said inner frame in opposite directions so as to adjust said cap receptacle from an upwardly facing cap-receiving position to a downwardly facing cap-discharging position and from said cap-discharging position to upwardly facing cap-receiving position.

12. In jar capping apparatus of the class described an outer frame structure, means mounting said outer frame structure for vertical reciprocating movement, means for effecting such movement of said outer frame, an elongated inner frame structure having substantially parallel elongated side members, a cap receptacle, means mounting said receptacle on said inner frame side members so as to permit adjustment of said receptacle longitudinally of said inner frame, electro-magnetic means associated with said receptacle for magnetically holding a cap in said receptacle, electrical conductor strips carried by but insulated from said inner frame side members, contact members carried by said receptacle mounting means for slidable contacting said conductor strips, flexible electrical conductor wires connected to said conductor strips for delivering electrical current to said strips, means for alternately turning said inner frame in opposite directions so as to adjust said cap receptacle from an upwardly facing cap-receiving position to a downwardly facing cap-discharging position and from said cap-discharging position to upwardly facing cap-receiving position, and means for controlling said turning and rotation of said receptacle and the flow of electrical current to said magnetic means as an incident to reciprocation of said outer frame.

13. Jar capping apparatus of the class described, comprising a conveyor for successively delivering to a predetermined position, each of a succession of cartons each containing a plurality of jars in predetermined arrangement, stop means engageable by the successive cartons for stopping the same in said predetermined position, a cap carrier mounted for vertical reciprocation into proximity to, and from said predetermined carton position, means for effecting such reciprocation of said cap carrier, means for effecting application of caps carried by said carrier to jars in a carton in said predetermined position as an incident to downward movement of said cap carrier, electric switch means engageable by cartons delivered by said conveyor to said predetermined position, and electrically actuated means operative as an incident to such engagement of said switch to initiate cap applying movement of said carrier.

14. In jar capping apparatus, a cap carrying structure comprising an outer frame, a plurality of inner frames pivotally mounted on said outer frame, a plurality of receptacles mounted on each of said inner frames, one of said inner frames being mounted on said outer frame so as to be adjustable relative to another thereof, thereby to facilitate adjustment of said cap carrier to position said cap receptacles in conformity to the spacing of jars of various sizes.

15. A jar capping apparatus comprising means for supporting a plurality of jars in predetermined arrangement, a cap carrier mounted for movement toward and from said supporting means, said cap carrier comprising a frame, a plurality of cap receptacles mounted on said frame in laterally spaced relation to each other and for turning movement on axes normal to the direction in which the carrier is movable as aforesaid, whereby the receptacles are invertable from upwardly facing cap receiving positions to downwardly facing cap discharging positions by turning movement which is independent of the movement of the carrier toward and from said supporting means as aforesaid, said receptacles being arranged on said frame in positions substantially corresponding to the positions of jars disposed on said supporting means as aforesaid, means for effecting movement of said carrier and receptacles toward and from said supporting means and jars positioned thereon as aforesaid, means for effecting turning of said receptacles as to invert the same as aforesaid to face the caps in said receptacles toward jars on said support to thereby position the caps for application to said jars, and means in said receptacles for retaining said caps in said receptacles during the inversion and movement of the receptacles toward said jars.

16. Jar capping apparatus comprising means for supporting a carton containing a plurality of rows of jars arranged side by side in the carton, means for positioning such carton of jars on said support, a cap carrier mounted for vertical movement toward and from said support, said carrier having means for positioning a plurality of rows of caps in the side by side arrangement of the jars in a carton as aforesaid, means for automatically feeding caps to said row arrangement in said carrier, and electric switch means actuated as an incident to the positioning of a carton of jars as aforesaid in cap receiving position on said supporting means, and electrically actuated means controlled by said switch means for initiating movement of said carrier toward said support to simultaneously apply the rows of caps in said carrier to the rows of jars in the carton positioned as aforesaid.

17. Jar capping apparatus of the class described, comprising a conveyor for successively delivering to a predetermined position, each of a succession of cartons respectively containing a plurality of jars in predetermined arrangement, carton stop means in the path of movement of cartons advanced by said conveyor for stopping successive cartons in said predetermined position, a cap carrier mounted for reciprocation toward and from said predetermined carton position, means for effecting such reciprocation of said cap carrier, means for effecting application of caps carried by said carrier to jars in a carton in said predetermined position upon movement of said carrier toward jars on said conveyor, and means associated with said stop for initiating a cap applying cycle of operation of the apparatus upon delivery of a carton of jars into engagement with said stop means.

18. In jar capping apparatus of the class described, a vertically movably mounted cap carrier comprising an initially upwardly facing receptacle adapted, when the carrier is in an elevated position, to receive a cap, means mounting said receptacle on said carrier for rotary movement and for turning from upwardly facing cap receiving position to downwardly facing cap applying position, means for effecting turning and rotation of said receptacle and movement of said carrier from an elevated cap receiving position to a lowered cap applying position and for restoring said receptacle to upwardly facing elevated cap receiving position.

19. In jar capping apparatus of the class described, a vertically movably mounted cap carrier comprising an initially upwardly facing receptacle adapted when the carrier is in elevated position to receive a cap, means mounting said receptacle on said carrier for rotary movement and for turning from upwardly facing cap-receiving position to downwardly facing cap-applying position, means for effecting movement of said carrier from an elevated cap-receiving position to a lowered cap-applying position, means for effecting turning and rotation of said receptacle, means for initiating said rotation and turning movements during an initial portion of the downward movement of said carrier to cap-applying positions, for stopping the rotation of said receptacles upon completion of downward movement, and for restoring said receptacles to upwardly facing cap-receiving position during the upward return movement of the carrier to cap-receiving position, cap feeding means for delivering caps to said receptacle, and means for actuating said cap-delivering means upon return of said receptacle from cap-applying position to cap-receiving position.

JOE BOWEN.

References Cited in the file of this patent

UNITED STATES PATENTS

| Number | Name | Date |
|---|---|---|
| 1,183,084 | La Porte | May 16, 1916 |
| 1,200,482 | Garman | Oct. 10, 1916 |
| 1,233,468 | Heath | July 17, 1917 |
| 1,278,038 | Sharp | Sept. 3, 1918 |
| 1,445,296 | Clark | Feb. 13, 1923 |
| 1,470,348 | Clark | Oct. 9, 1923 |
| 1,748,960 | Risser | Mar. 4, 1930 |
| 1,767,813 | Smulski | June 24, 1930 |
| 1,882,330 | Leahy | Oct. 11, 1932 |
| 2,005,186 | Griswold | June 18, 1935 |
| 2,218,452 | Jackson | Oct. 15, 1940 |

FOREIGN PATENTS

| Number | Country | Date |
|---|---|---|
| 317,619 | Great Britain | Aug. 22, 1929 |